United States Patent [19]

Schmadel, Jr. et al.

[11] Patent Number: 4,636,031
[45] Date of Patent: Jan. 13, 1987

[54] PROCESS OF TUNING A GRATED OPTICAL FIBER AND THE TUNED OPTICAL FIBER

[75] Inventors: Donald C. Schmadel, Jr., Kensington; Jack E. Goodman, Germantown, both of Md.

[73] Assignee: Chevron Research Company, San Francisco, Calif.

[21] Appl. No.: 546,610

[22] Filed: Oct. 28, 1983

[51] Int. Cl.⁴ .................................................. G02B 6/34
[52] U.S. Cl. .................. 350/96.19; 350/96.20; 350/96.29; 350/320
[58] Field of Search ............... 350/96.15, 96.19, 96.20, 350/96.21, 96.29, 96.30, 96.33, 320, 162.17, 162.20

[56] References Cited

U.S. PATENT DOCUMENTS

| 3,891,302 | 6/1975 | Dabby et al. | 350/96.19 |
| 4,268,116 | 5/1981 | Schmadel et al. | 350/96.29 |
| 4,345,816 | 8/1982 | Nakai et al. | 350/96.20 |
| 4,400,056 | 8/1983 | Cielo | 350/96.19 |
| 4,444,458 | 4/1984 | Stowe et al. | 350/96.15 |
| 4,444,460 | 4/1984 | Stowe | 350/96.19 |

FOREIGN PATENT DOCUMENTS

| 54-11753 | 1/1979 | Japan | 350/96.21 |
| 55-110207 | 8/1980 | Japan | 350/96.19 |
| 56-133707 | 10/1981 | Japan | 350/96.21 |

Primary Examiner—John Lee
Attorney, Agent, or Firm—S. R. LaPaglia; E. J. Keeling; E. A. Schaal

[57] ABSTRACT

A tuned optical fiber grating and a tuning process is disclosed. The gratings on the optical fiber ar tuned so that the reflectance of the grating can occur at a specific wavelength. The process involves encasing that portion of the fiber containing the grating while shining light of the wavelength of desired reflectance through the fiber and stretching the grating until reflectance occurs. Thereafter, the tuned grating is sealed within a tube formed around the tuned grating.

19 Claims, 1 Drawing Figure

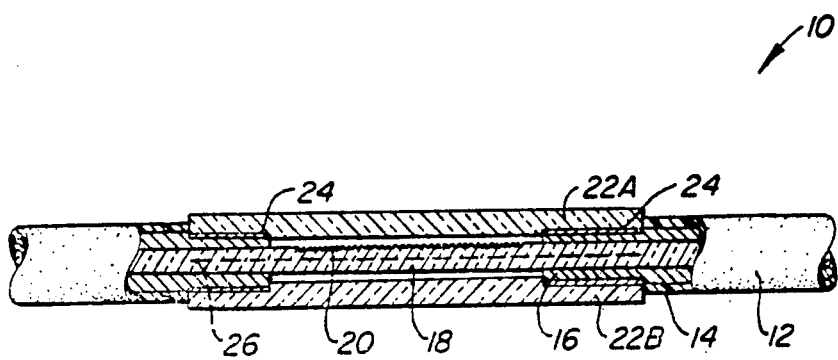
FIGURE

PROCESS OF TUNING A GRATED OPTICAL FIBER AND THE TUNED OPTICAL FIBER

CROSS REFERENCE TO RELATED APPLICATIONS

"A Process of Fabricating a Portion of an Optical Fiber Capable of Reflecting Predetermined Wavelength Bands of Light", by D. C. Schmadel, Jr., U.S. Ser. No. 546,608, filed Oct. 28, 1983 (now abandoned); "A Ruggedized Grated Optical Fiber, by J. E. Goodman et al, U.S. Ser. No. 546,609, filed Oct. 28, 1983 (U.S. Pat. No. 4,593,969); "Process and Apparatus for Measuring an Evanescent Field in an Optical Fiber, By D. C. Schamdel, Jr., U.S. Ser. No. 546,611, filed Oct. 28, 1983; "Optical Fiber Coating Apparatus", by J. E. Goodman, U.S. Ser. No. 546,617, filed Oct. 28, 1983 (U.S. Pat. No. 4,505,223); "Etching Fountain, by J. E. Goodman, U.S. Ser. No. 546,618, filed Oct. 28, 1983 (U.S. Pat. No. 4,469,544); "Optical Fiber Holder", by J. E. Goodman, U.S. Ser. No. 546,619, filed Oct. 28, 1983.

This invention relates to grated optical fibers. More specifically, this invention relates to a process of tuning a grated optical fiber to a predetermined wavelength of reflectivity.

BACKGROUND OF THE INVENTION

Gratings can be formed in optical fibers as taught by B. S. Kawaski et al, *Optics Letters*, Vol. 3, No. 2, August 1978, incorporated herein by reference and A Process Of Fabricating A Portion Of An Optical Fiber Capable Of Reflecting Predetermined Wavelength Bands Of Light by Donald C. Schmadel, Jr., said application filed concurrently herewith and completely incorporated herein by reference and assigned U.S. application Ser. No. 546,608, filed Oct. 28, 1983 (now abandoned). Grated optical fibers can be used as Bragg reflectors. When coupled in pairs, grated fibers can be used as interferometers to detect pressure changes in an undersea environment or down a wellbore.

The gratings are extremely fragile and reduce the mechanical strength of the fiber. Therefore, the fibers must be encased, i.e., ruggedized, as taught in A Ruggedized Grated Optical Fiber by Donald C. Schmadel, Jr. and Jack E. Goodman, filed concurrently herewith and completely incorporated herein by reference and assigned U.S. application Ser. No. 546,609, filed Oct. 28, 1983 (U.S. Pat. No. 4,593,969).

Forming gratings on such a small object is not an exact process. However, it is necessary that gratings be capable of reflecting very specific and narrow wavelength bands of light for most commercial applications. Thus, it would be desirable to be able to tune a fiber which reflects at a non-desirable wavelength so that it reflects light at a desired wavelength. The ability to tune the fiber would cut down on the cost required to manufacture exact reflective gratings and the need to throw away improperly fabricated gratings.

SUMMARY OF THE INVENTION

We have invented a process of tuning an optical fiber to permit its adjustment so that the gratings reflect light at predetermined wavelengths. The process of tuning permits the use of grated fibers which would otherwise have to be discarded as unsuitable for reflectors or interferometers. The process further incorporates the ability of encasing the fiber in a ruggedized container while tuning the exact frequency of reflectivity.

BRIEF DESCRIPTION OF THE DRAWING

The FIGURE illustrates an embodiment of a tuned optical fiber of the invention.

DETAILED DESCRIPTION OF THE INVENTION

The techniques for forming gratings, although exact, are not always as precise as necessary to create a specific reflectance of light passing through fiber. When the gratings need to be coupled in pairs to form an interferometer for use in for example an optical hydrophone, the uniformity of reflectance from grating to grating is an absolute necessity. Pairs of gratings are defined as sections of the fiber which contain gratings and are separated by a length of non-grated optical fiber. For example, a fiber whose grating reflects light at 8,000 Angstroms cannot be effectively coupled with a fiber whose grating reflects light at 8,100 Angstroms to create the interferrometer for use in an optical geophone. Therefore, one of the gratings would have to be replaced with a grating which matches the reflectance of the remaining grating. Every time a grating has to be spliced into the fiber, optical losses are introduced into the system. The additive effect of the losses reduces the distance over which the light can pass through the fiber without additional amplification. In addition, it is quite possible that if the exact desired wavelength were, for example, 8,200 Angstroms then neither of the gratings would be suitable. Since an optical fiber geophone assembly will contain up to 60 separate gratings on a fiber which must be designed to pair up so that 30 pairs of gratings are formed, a process must be available to tune the gratings so that the gratings can be roughly fabricated and then tuned to the desired frequency.

The tuning of the fibers is extremely difficult because the process of forming the grating greatly reduces the mechanical strength of the fiber. During the process of forming the gratings, the outer jacket of the fiber is removed revealing an inner sheath. Preferably, an optical fiber is used which contains a metal coating for the inner sheath such as indium or the like. Part of this inner sheath is removed down to a central core in which evanescent waves are encountered. It is this portion of the fiber in which the gratings are formed. The gratings are formed by photolithographic techniques or other suitable means.

The process is explained by referring to a completed embodiment of the invention illustrated as a tuned ruggedized grated optical fiber 10 in the FIGURE. Two semi-tubular shapes 22A and 22B are metalized 24 on the ends and fitted around the core 18 to form a tube. The semi-tubular shapes 22A and 22B have a longitudinal seam illustrated by the dashed line 26. The semi-tubular shapes can be any suitable low stretch material such as $SiO_2$, quartz or Super Invar ®. Preferably, the material matches the thermal properties of the fiber. The semi-tubular shapes contact the metalized inner sheath 16 of the optical fiber 12, without its outer sheath 14, on opposed ends of the exposed inner sheaths 16 over the exposed core 18 containing the gratings 20. Thereafter, one end of the tube is sealed to the metalized inner sheath with solder or other suitable sealing materials such as epoxy or hot melt adhesives. The longitudinal seam 26 between the ends of the semi-tubular shapes 22A and 22B are sealed with epoxy or other suitable materials. Next, the soldered end of the fiber is fixed in a stationary position. The non-soldered end of the fiber is stretched and light of the appropriate wavelength for reflectance is injected into one end of the fiber. The stretching operation continues until the grating 20 is stretched to a point where the desired reflectance occurs. This tunes the fiber to the exact wavelength of light desired for reflectance. Thereafter, the second end of the tube is soldered to the opposite metalized inner sheath.

Alternatively, the optical fiber is laid into one of the half tubes, tuned by stretching the fiber and the ends are sealed to the inner sheath. After the tuning the other half tube is sealed to the half tube containing the tuned fiber.

Optionally, the tube can be filled with any suitable dampening medium such as oil to reduce the possible oscillations of the gratings. The dampening medium must have a lower index of refraction than the gratings to avoid light leaking out of the fiber. If the material has the same index of refraction as the gratings, then the fiber will transmit light as if there are no gratings and no reflectance will occur.

The process can be repeated for any grating along the fiber to precisely tune its reflectance. If desired, the tuning process can be carried out on alternate pairs of gratings to form inter-digitated interferometers, i.e., the first grating is tuned to the third and the second to the fourth, etc. The gratings can be tuned in any desired configuration. Since the grated fibers have a greatly reduced mechanical strength, the tuning process is only suitable over a region of about 500 Angstroms and preferably less than about 200 Angstroms for the wavelengths of light reflected by the grating. The exact amount of the stretching is a function of the depth of the gratings and the size and type of fiber employed. Ideally, the fibers are stretched as little as possible to obtain a desired reflectance because as the stretching increases so does the tendency to have the gratings stretch non-uniformly. This results in a reflectance pattern which is not sharply defined.

Having described the process with respect to particularly preferred embodiments, it is not our intention to be limited solely to these preferred embodiments. Modifications which would be obvious to the ordinary skilled artisan are contemplated to be within the scope of the invention.

What is claimed is:

1. A process of sealing and tuning a grated optical fiber capable of reflecting a particular wavelength or wavelengths of light, said process comprising:
    (a) encasing the portion of an optical fiber containing a grating within a tube formed from two semi-tubular sections;
    (b) sealing the tube to an inner sheath of the optical fiber at one end of the grating;
    (c) sealing the semi-tubular sections along their longitudinal seams;
    (d) injecting light of a predetermined wavelength into an end of said optical fiber, said predetermined wavelength being greater than the wavelength of reflectance of the grating;
    (e) stretching the optical fiber until reflectance occurs at the grating at the predetermined wavelength; and
    (f) sealing the other end of the tube to the inner sheath of the optical fiber so as to form a seal around the grating.

2. The process according to claim 1 wherein the sealing of steps (b) and (f) is done by soldering or hot adhesive melt adhering the tube to the inner sheath.

3. The process according to claim 2 wherein the sealing of step (c) along the longitudinal seams is done with epoxy, solder, or hot melt adhesives.

4. The process according to claim 3 wherein the fiber is stretched to reflect light having a wavelength greater than the reflectance of the unstretched grating but less than about 500 Angstroms higher than the reflectance of the unstretched grating.

5. The process according to claim 4 wherein the grating is designed to reflect light of a specific wavelength between 7,000 and 15,000 Angstroms.

6. The process according to claim 5 wherein pairs of gratings are tuned to reflect light of the same wavelength.

7. The process according to claim 6 further comprising injecting a dampening medium having a lower index of refraction than the gratings into the semi-tubular sections in the area over the gratings prior to sealing the sections together.

8. The process according to claim 7 wherein oil is injected into the semi-tubular sections.

9. The article fabricated in accordance with the process of claim 6.

10. The article fabricated in accordance with the process of claim 7.

11. A process of sealing and tuning a grated optical fiber comprising:
    (a) placing the grated portion of an optical fiber into a semi-tubular section, wherein the grated portion of the optical fiber is capable of reflecting light at a particular wavelength;
    (b) injecting light of a predetermined wavelength into an end of the optical fiber, said predetermined wavelength being greater than the particular wavelength of reflectance of the grated portion of the optical fiber;
    (c) stretching the grated portion of the optical fiber until reflectance occurs at the grated portion at the predetermined wavelength;
    (d) sealing the semi-tubular section to the portions of an inner sheath of the optical fiber on opposite ends of the grated portion of the optical fiber; and
    (e) forming a tube around the tuned grated portion with a second semi-tubular section.

12. The process according to claim 11 wherein the forming of step (e) is done by sealing the longitudinal seam formed between the semi-tubular sections with epoxy and the ends of the semi-tubular sections are sealed with solder.

13. The process according to claim 12 wherein pairs of grated portions are tuned to reflect light of the same wavelength.

14. The process according to claim 12 wherein the space around the grated portion of the optical fiber surrounded by the tube is filled with a dampening medium having a lower index of refraction than the grated portion of the optical fiber.

15. The process according to claim 14 wherein oil is injected into the space surrounding the grated portion of the optical fiber.

16. The article fabricated according to the process of claim 13.

17. The article fabricated according to the process of claim 14.

18. A tuned optical fiber having at least one grating capable of reflecting a specified wavelength of light comprising:

an optical fiber containing at least one grating; and a tube fabricated from two semi-tubular sections around said grating and sealed to an inner sheath of the optical fiber on opposite ends of said grating, wherein said gratings are under a positive tension to reflect light at a predetermined wavelength which is greater than the wavelength of reflectance of the grating initially formed when not under a positive tension.

19. The optical fiber according to claim 18 wherein the optical fiber has a plurality of gratings and pairs of gratings are capable of reflecting light of the same wavelength.

* * * * *